United States Patent [19]
Bradshaw

[11] Patent Number: 5,353,071
[45] Date of Patent: Oct. 4, 1994

[54] PILOT/SAFETY GLASSES

[76] Inventor: Ron J. Bradshaw, Meaford, Ontario, Canada, N0H 1Y0

[21] Appl. No.: 920,685

[22] Filed: Jul. 28, 1992

[51] Int. Cl.$^5$ .............................................. G02C 1/00
[52] U.S. Cl. ..................................... 351/158; 2/422
[58] Field of Search ................... 351/47, 57, 155, 156, 351/158; 2/6, 209, 422

[56] References Cited

U.S. PATENT DOCUMENTS

| | | | |
|---|---|---|---|
| 349,155 | 9/1886 | Waddell | 351/155 |
| 4,372,429 | 2/1983 | Marx | 188/322.12 |
| 4,387,471 | 6/1983 | Hsu et al. | 2/10 |
| 4,464,797 | 8/1984 | Glassman | 351/155 |
| 4,768,231 | 9/1988 | Schrack | 351/158 |
| 4,810,081 | 3/1989 | Mapelli et al. | 351/57 |
| 4,856,089 | 8/1989 | Horton | 2/209 |
| 5,123,115 | 6/1992 | Braswell-Moore | 351/155 |
| 5,138,722 | 8/1992 | Urella | 2/209 |
| 5,173,721 | 12/1992 | Green | 351/158 |

FOREIGN PATENT DOCUMENTS

| | | | |
|---|---|---|---|
| 1319413 | 1/1963 | France | 351/155 |
| 2409021 | 7/1979 | France | 2/422 |

Primary Examiner—Richard A. Bertsch
Assistant Examiner—Howard R. Richman
Attorney, Agent, or Firm—Faye, Sharpe, Beall, Fagan, Minnich & McKee

[57] ABSTRACT

Apparatus for securing a pair of eyeglasses to the headband of a headset worn by a person, comprising an attachment removably connected to the headband, a flexible boom connected to the attachment, and a clamp disposed at an end of the flexible boom remote from the attachment for removably connecting the pair of eyeglasses such that the pair of eyeglasses are adjustably positionable relative to the eyes of the person.

16 Claims, 5 Drawing Sheets

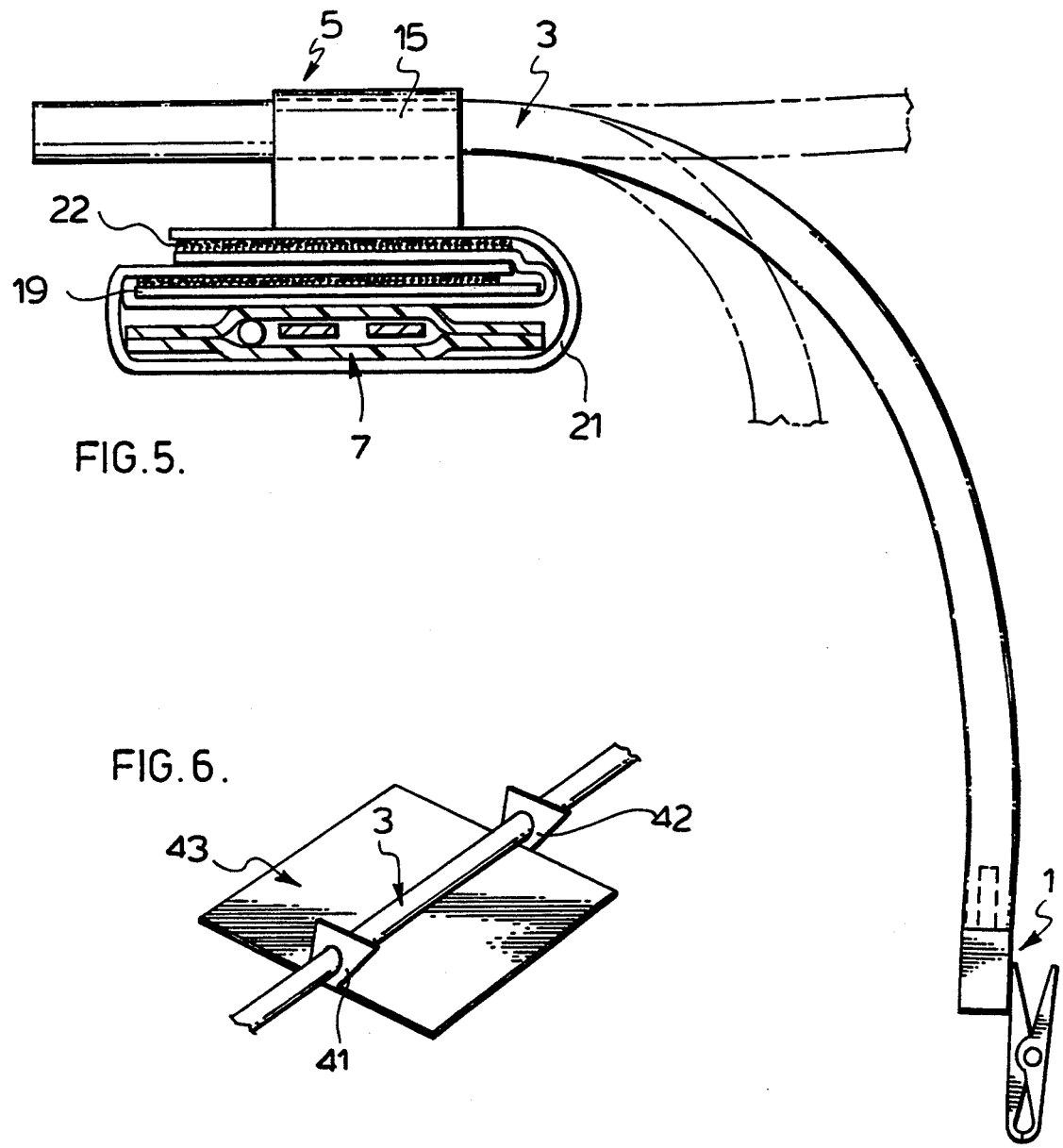

PILOT/SAFETY GLASSES

FIELD OF THE INVENTION

The present invention relates in general to eyeglasses, and more particularly to an apparatus for securing a pair of eyeglasses to the headband of a headset worn by a pilot or operator of heavy machinery, or anyone required to wear a headset (e.g. football coach).

BACKGROUND OF THE INVENTION

There are a variety of different models of aviation headphones or headsets sold by various companies in North America. In all but a few instances, the essential purpose of the headphones is to enhance verbal communication by reducing cockpit noise which may be sufficiently high to cause permanent hearing loss.

Reduction of the cockpit noise is achieved primarily by the close fit of the noise attenuating ear cover portions of the headphones to the circumference of the ear. It has been found that in order to wear eyeglasses in the normal fashion (i.e. supported via earstems or temple supports from the ears), the noise attenuation integrity of the headphones must be compromised. The metal or plastic earstem supports are known to cause an opening between the headphones and the upper cheekbone of the person wearing the headphones, which in turn substantially increases cockpit noise thereby interfering with communication. Therefore, the essential purpose for wearing a set of headphones, which can cost from approximately $200.00 to $1000.00, is compromised by wearing a pair of eyeglasses.

Moreover, wearing normal eyeglasses with a set of headphones has been found to be uncomfortable. The weight and compression of the headphones result in pressure points; that of the temples against the side of the head and the nose pads against the bridge of the nose. In such circumstances, people have been known to experience headaches.

Many pilots are required to wear prescription glasses while flying, and for all pilots sight can be enhanced during daylight flying by the use of a good pair of sunglasses. Therefore, it is an object of the present invention to provide a supplemental supporting device for eyeglasses which is simple, adjustable and economical.

Furthermore, in many industries, people are required to wear headsets and safety glasses in order to protect their hearing and sight. Therefore, it is a further object of the present invention to provide a supplemental supporting device for safety glasses for use with a noise attenuating headset which is both comfortable and efficient.

SUMMARY OF THE INVENTION

According to the present invention, a supporting device is provided for securing a pair of eyeglasses to the headband of a headset worn by a person. To accommodate the quick and easy change from sun to prescription or safety glasses, the supporting device of the present invention is attached to the eyeglasses by a manual clamp, as discussed in greater detail below.

In accordance with a general aspect of the present invention, there is provided apparatus for securing a pair of eyeglasses to the headband of a headset worn by a person, comprising:

a) attachment means removably connected to said headband;

b) flexible boom means connected to said attachment means;

c) clamp means disposed at an end of said flexible boom means remote from said attachment means for removably connecting said pair of eyeglasses such that said pair of eyeglasses are adjustably positionable relative to the eyes of said person.

BRIEF INTRODUCTION TO THE DRAWINGS

A detailed description of the preferred embodiment is provided hereinbelow with reference to the following drawings, in which:

FIG. 5 is a cross-sectional side view through the headband, base portion and tube fitting of the present invention; and FIG. 6 is a perspective view of an alternative embodiment of headband clamp.

DETAILED DESCRIPTION OF THE PREFERRED EMBODIMENT

Figure 1:
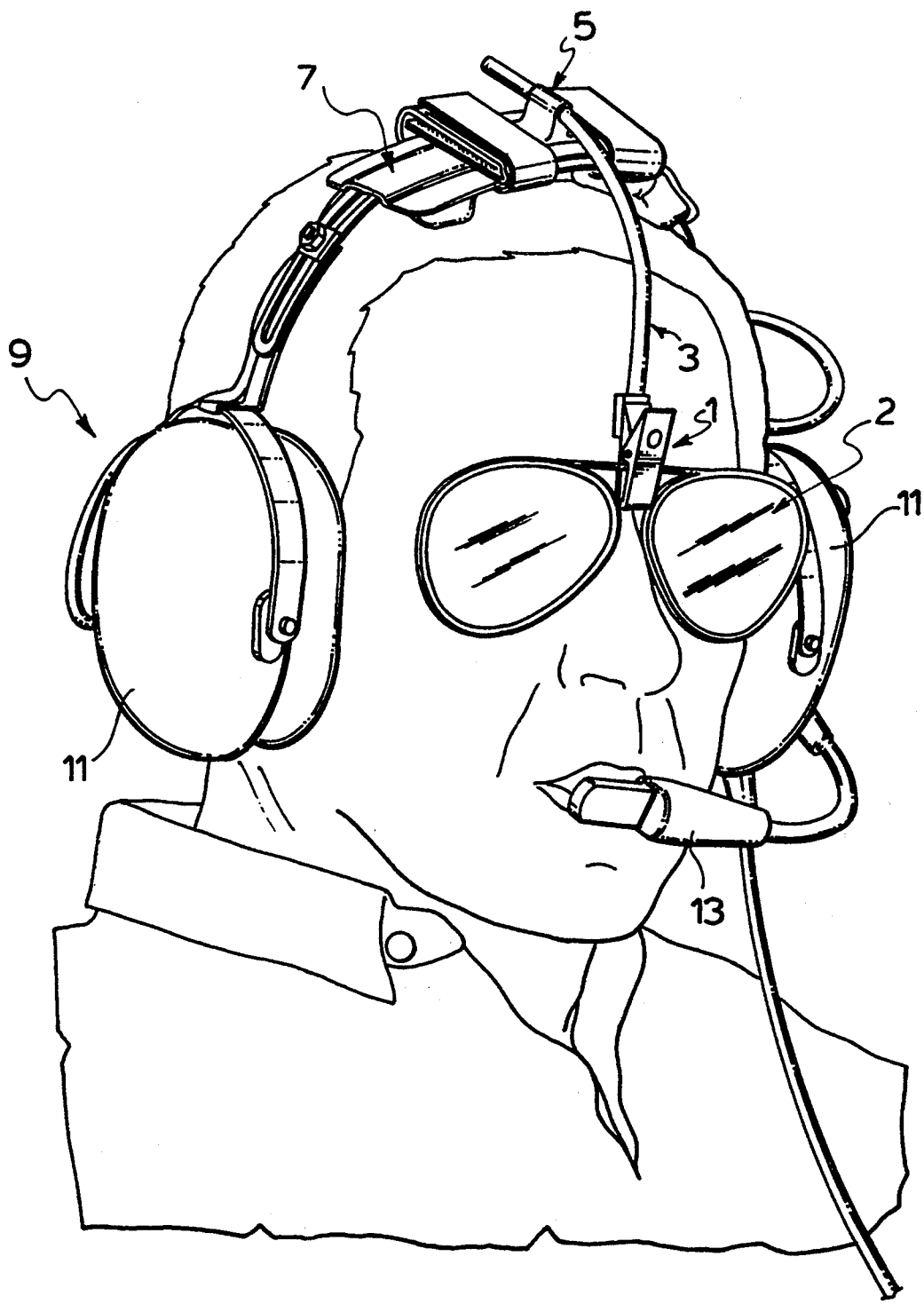
FIG. 1 is a perspective view of the apparatus for securing a pair of eyeglasses to the headband of a headset worn by a person, according to the present invention.
Figure 2:
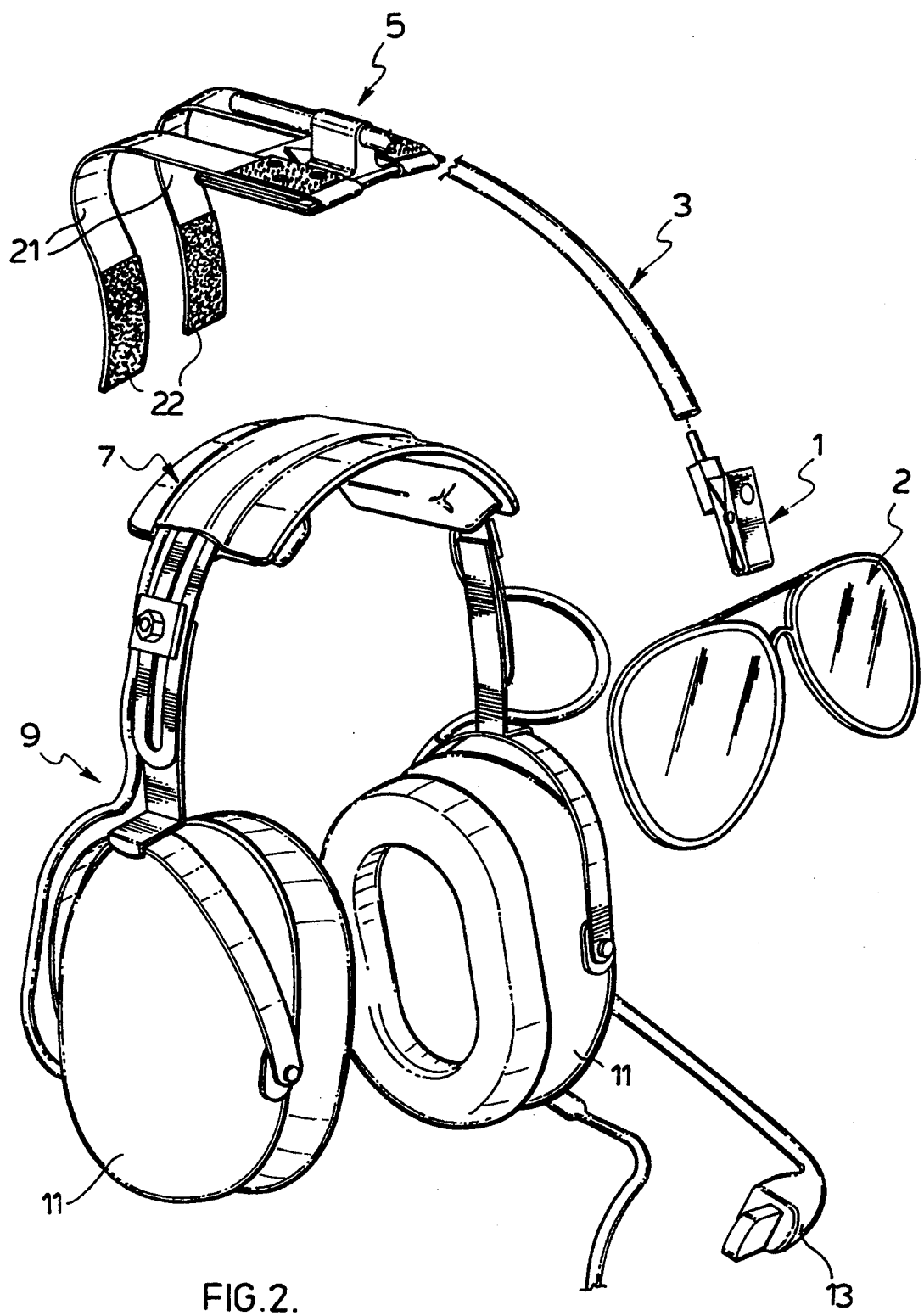
FIG. 2 is a perspective view showing the method of attaching the apparatus to the headband of the headset of FIG. 1.

With reference to FIGS. 1 and 2, the apparatus of the present invention is shown comprising an eyeglass clamp 1 for connection to a pair of eyeglasses 2, a flexible boom (flex-tube) 3 and a headband clamp or attachment 5 for connection to the headband 7 of a headset 9 which includes a pair of earphones 11 and microphone 13. As shown in FIGS. 1, 2, and 5 the eyeglasses 2 may be positioned relative to the eyes of the person wearing the headset by means of the flexible boom 3, without the requirement of earstem supports on the eyeglasses. Accordingly, the noise attenuation characteristics of the headphones 11 is greatly enhanced.

Figure 3A:
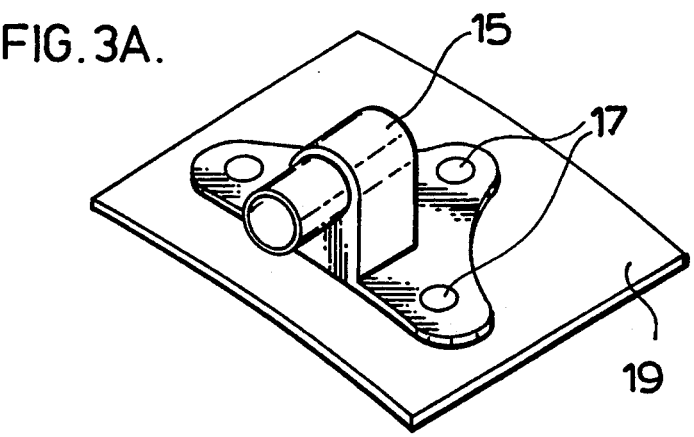
FIGS. 3A, 3B and 3C show a base portion and tube fitting removably connected to the headband.
Figure 3B:
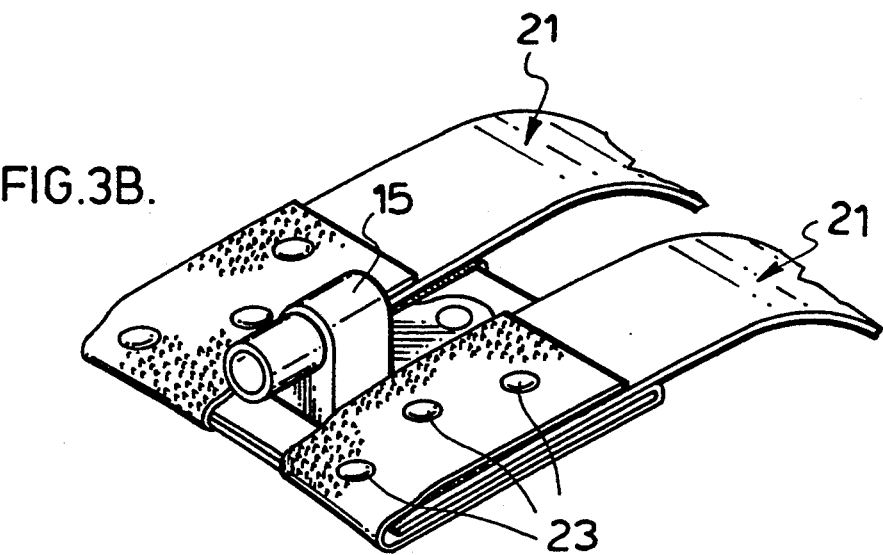

Turning to FIGS. 3A–3B, the construction of the headband clamp 5 is shown in greater detail comprising a tube fitting 15 which is riveted at 17 to an aluminum sheet base portion 19 having a slight curvature to accommodate the shape of the headband 7.

Figure 3C:
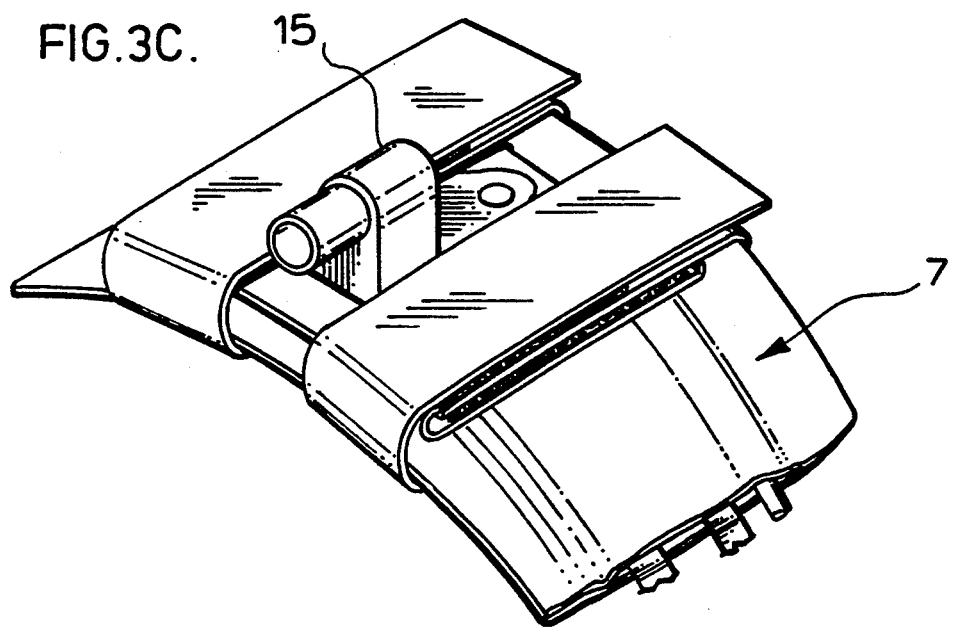

A pair of attachment strips 21 are riveted at 23 and used to secure the base portion 19 to the headband 7 by wrapping therearound, as shown in FIG. 3C. The attachment strips 21 are preferably fabricated using Velcro ™, or other suitable fastening means 22, so that the apparatus may be easily secured to and removed from a standard headset 9. The structure of the headband clamp 5 positioned on top of the headband 7 with attachment strips 21 passing underneath, up and over the headband 7, is shown in greater detail with reference to FIG. 5. FIG. 5 also illustrates the degree of movement of the flexible boom 3 for adjustably positioning the pair of eyeglasses relative to eyes of the person wearing the headset.

The inside diameter of the tube fitting 15 (FIG. 3A) must be closely matched to the outside diameter of the flexible boom 3 in order to provide a close interference fit between the tube fitting 15 and the flexible boom 3, thereby eliminating the requirement for a set screw to pass through the fitting 15. Friction is increased by bending the flexible boom 3 adjacent to either the front or rear opening of the fitting 15. In the successful prototype, the inside diameter of the tube fitting was 19/64". Depending upon whether silicon, aluminum or plastic material is used for production, the diameter dimensions may vary slightly.

Figure 4A:
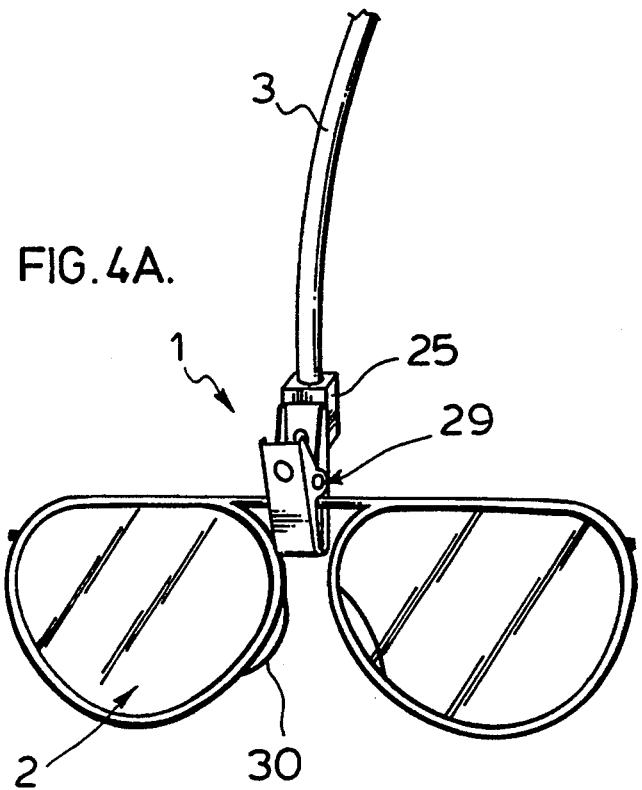
FIGS. 4A and 4B are perspective views of an eyeglass clamp according to the apparatus of the present invention.
Figure 4B:
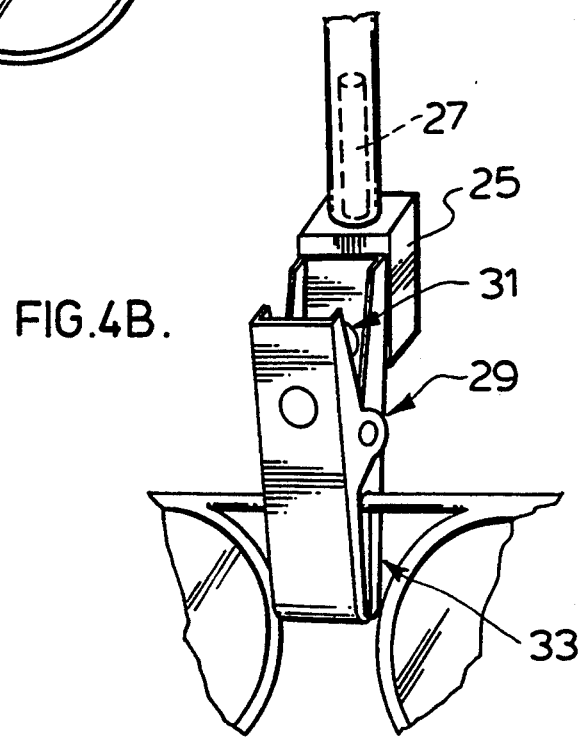

Turning to FIGS. 4A and 4B, the eyeglass clamp 1 is shown in greater detail comprising a small aluminum block 25 attached to the flexible boom via a metal pin 27 inserted tightly into the hollow tubular boom 3 as shown in FIG. 4B. A pair of spring loaded jaws 29 (preferably a Telex ™ cable clamp) are attached to the aluminum block 25 via a single rivet 31.

Since there is little pressure of the nose pad 30 against the nose in the eyeglasses 2 of the present invention, separate pads on the eyeglasses may be eliminated.

The clamp 1 is most effective when the double nose bridge of the pair of eyeglasses 2 is wrapped with several layers of PVC tape 33. Glasses, mass produced, should be designed so that the area between the double nose bridge of the eyeglasses may be filled or built up with material such as silicon to enable secure clamping.

The flexible boom 3, (e.g. flex-tube) is preferably covered by heat shrink PVC. In the successful prototype, the flexible boom was approximately 7" long (18 cm) with a nominal ¼" diameter and covered with PVC, the flex-tube is approximately 9/32" thick (approximately 7 mm). The flexible boom 3 is commercially available in two different weights; the heavier weight, with a stronger spring, supports greater weight. The lighter weight flex-tube is recommended for the supporting device of the present invention since the flexible boom 3, once positioned remains stationary for supporting its own weight and the weight of the eyeglasses 2.

FIG. 6 shows an alternative embodiment of headband clamp wherein two wing portions 41 and 42 are bent upwardly from an aluminum sheet base portion 43. The flexible boom 3 passes through circular holes in the wing portions 41 and 42 to form an interference fit. Applying pressure to the flexible boom 3 at wing portions 41 and 42 increases the friction between these components so as to lock the boom in place.

Preferably, two sets of frames and eyeglasses 2 may be sold in a commercial package; one set comprising a pair of quality sunglasses and the other set comprising safety glasses. It is contemplated that the user may exchange either set of lenses for prescription glasses as required.

In testing of the successful prototype, it has been found that since the eyeglasses are supported from the headband 7 from the top of the user's head, there are no pressure points against the upper cheekbones or temples as occurs when the user is forced to wear normal eyeglasses with earstems in combination with the headset 9. The capability of the flexible boom 3 to adjustably position the eyeglasses 2 relative to the eyes of the wearer results in the ability to undertake detailed cockpit work (e.g. record a clearance) by simply flipping the eyeglasses 2 upwardly away from the eyes. Similarly, if a pilot is required to wear reading glasses, as soon as the cockpit work is completed, the eyeglasses may be flipped upwards and the pilot may commence outside scanning for other aircraft. As discussed above, either the sun or prescription lenses, safe and secure, are immediately available to the pilot. Furthermore, as discussed above, the apparatus of the present invention may be used in situations where protective or prescription lenses are required to be worn with noise attenuation headsets commonly used by operators of heavy equipment (e.g. farm machinery, lawn-mowers, bulldozers, etc.).

Other embodiments, applications and variations of the invention are possible within the sphere and scope of the claims appended hereto.

I claim:

1. An apparatus for securing a pair of eyeglasses to a headband of a headset worn by a person, comprising:
   a) attachment means having a base portion removably connected to said headband via at least one strip of material wound around said base portion and said headband and adjustably secured so as to accommodate different circumferences in cross-section of said headband, and a tube fitting connected to said base portion;
   b) flexible boom means received within said tube fitting and adjustably secured therein via an interference fit, such that the length of said flexible boom means extending from said tube fitting may be adjusted to accommodate different sizes of said person's head; and
   c) clamp means disposed at an end of said flexible boom means remote from said attachment means having a pair of spring loaded jaws for connection to a nose bridge portion of said pair of eyeglasses, whereby said pair of eyeglasses are adjustably positionable relative to the eyes of said person.

2. The apparatus of claim 1 wherein said base portion conforms in curvature to said headband.

3. The apparatus of claim 1 wherein said tube fitting is connected to said base portion via rivets.

4. The apparatus of claim 1 wherein said flexible boom means is fabricated from a flexible tubular material covered with a polyvinyl chloride shrink sleeve.

5. The apparatus of claim 1 further comprising a block riveted to said clamp means and a pin extending from said block for insertion into said end of said flexible boom means remote from said attachment means.

6. The apparatus of claim 1 wherein said headset further comprises a pair of headphones and a microphone for communication.

7. The apparatus of claim 1 wherein said headset further comprises a pair of noise attenuating ear covers.

8. The apparatus of claim 1 wherein said attachment means further comprises a base portion removably connected to said headband, a pair of wing portions projecting from opposite ends of said base portion and an aperture in each of said pair of wing portions for receiving said flexible boom means via an interference fit.

9. The apparatus of claim 1 wherein said pair of eyeglasses comprise a frame for securing a pair of lenses and a nose bridge portion intermediate said pair of lenses.

10. The apparatus of claim 9 wherein said pair of lenses are tinted.

11. The apparatus of claim 9 wherein said pair of lenses are prescription lenses.

12. An apparatus for securing a pair of eyeglasses to a headband of a headset worn by a person, comprising:
   a) attachment means having a base portion connected to said headband and a tube fitting connected to said base portion;
   b) flexible boom means received within said tube fitting and adjustably secured therein via an interference fit, such that the length of said flexible boom means extending from said tube fitting may be adjusted to accommodate different sizes of said person's head; and c) clamp means disposed at an end of said flexible boom means remote from said attachment means having a pair of spring loaded jaws for connection to a nose bridge portion of said pair of eyeglasses, whereby said pair of eyeglasses are adjustably positionable relative to the eyes of said person.

13. An apparatus for securing a pair of eyeglasses to a headband of a headset worn by a person, comprising:
    a) attachment means having a base portion connected to said headband and a tube fitting connected to said base portion via rivets;
    b) flexible boom means connected to said attachment means via said tube fitting; and
    c) clamp means disposed at an end of said flexible boom means remote from said attachment means for removably connecting said pair of eyeglasses such that said pair of eyeglasses are adjustably positionable relative to the eyes of said person.

14. An apparatus for securing a pair of eyeglasses to a headband of a headset worn by a person, comprising:
    a) attachment means connected to said headband;
    b) flexible boom means connected to said attachment means; and
    c) clamp means disposed at an end of said flexible boom means remote from said attachment means, said clamp means including a pair of spring loaded jaws for connection to a nose bridge portion of said pair of eyeglasses, and a block riveted to said clamp means and a pin extending from said block for insertion into said end of said flexible boom means remote from said attachment means.

15. An apparatus for securing a pair of eyeglasses to a headband of a headset worn by a person, comprising:
    a) attachment means having a base portion connected to said headband, a pair of wing portions projecting from opposite ends of said base portion and an aperture in each of said pair of wing portions for receiving said flexible boom means via an interference fit;
    b) flexible boom means connected to said attachment means; and
    c) clamp means disposed at an end of said flexible boom means remote from said attachment means for removably connecting said pair of eyeglasses such that said pair of eyeglasses are adjustably positionable relative to the eyes of said person.

16. The apparatus of claim 15 wherein said base portion and pair of wing portions are fabricated from an aluminum sheet, said wing portions being bent approximately orthogonal to a plane of said base portion, whereby friction between said flexible boom means and said pair of wing portions increases in response to application of pressure to said flexible boom means at points adjacent said apertures.

* * * * *